United States Patent
Cha et al.

(10) Patent No.: US 8,943,294 B2
(45) Date of Patent: Jan. 27, 2015

(54) SOFTWARE ARCHITECTURE FOR SERVICE OF COLLECTIVE MEMORY AND METHOD FOR PROVIDING SERVICE OF COLLECTIVE MEMORY USING THE SAME

(75) Inventors: Gyu Il Cha, Daejeon (KR); Young Ho Kim, Daejeon (KR); Eun Ji Lim, Daejeon (KR); Dong Jae Kang, Daejeon (KR); Sung In Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 292 days.

(21) Appl. No.: 13/314,443

(22) Filed: Dec. 8, 2011

(65) Prior Publication Data

US 2012/0159115 A1    Jun. 21, 2012

(30) Foreign Application Priority Data

Dec. 17, 2010 (KR) ........................ 10-2010-0130098

(51) Int. Cl.
*G06F 12/10* (2006.01)
*G06F 12/06* (2006.01)

(52) U.S. Cl.
CPC ................................ *G06F 12/0653* (2013.01)
USPC .............................................. 711/203; 711/5

(58) Field of Classification Search
None
See application file for complete search history.

(56) References Cited

U.S. PATENT DOCUMENTS

| 7,917,599 B1* | 3/2011 | Gopalan et al. ............... 709/216 |
| 2009/0150511 A1* | 6/2009 | Gross et al. .................... 709/213 |
| 2009/0210431 A1* | 8/2009 | Marinkovic et al. ............ 707/10 |

* cited by examiner

*Primary Examiner* — Gary Portka
(74) *Attorney, Agent, or Firm* — Ladas & Parry LLP

(57) ABSTRACT

Disclosed is a software architecture supporting a large-capacity collective memory layer in a multi-node system by using a remote direct memory access technique and a software virtualization technique and a computing system performing computing processing by using the architecture. In particular, provided is a software architecture including: a memory region managing module collectively managing a predetermined memory region of a node, a memory service providing module providing a large-capacity collective memory service to a virtual address space in a user process, and a memory sharing support module supporting sharing of the large-capacity collective memory of the multi-node system.

18 Claims, 7 Drawing Sheets

SOFTWARE ARCHITECTURE FOR SERVICE OF COLLECTIVE MEMORY AND METHOD FOR PROVIDING SERVICE OF COLLECTIVE MEMORY USING THE SAME

CROSS-REFERENCE TO RELATED APPLICATIONS

This application claims priority to and the benefit of Korean Patent Application No. 10-2010-0130098 filed in the Korean Intellectual Property Office on Dec. 17, 2010, the entire contents of which are incorporated herein by reference.

TECHNICAL FIELD

The present invention relates to a software architecture for a service of a collective memory and a method for providing a service of a collective volume using the same. More particularly, the present invention relates to a software architecture for a service of a large-capacity collective memory and a method for providing a service of a large-capacity collective volume using the same.

BACKGROUND

In general, software technology that provides a service of a large-capacity collective memory is used for the purpose of improving efficiency of whole data processing by reducing input/output processing times in a system when there is an explosive increase in the volume of a memory used in a high-performance computing environment requiring real time/semi-real time centralized data processing.

The software technology providing the large-capacity collective memory service can be classified into three access methods according to a characteristic of a memory technologically provided on a system memory layer architecture.

A first method is to achieve magnification of a small-capacity off-chip memory (e.g., a DRAM) itself. This method is characterized in depending on new hardware as an access method to solve a problem of a size while maintaining the performance of an existing system memory. Further, a multi-node system (e.g., a cluster system and a cloud system) is limitative in that the large-capacity collective memory service cannot be extended to all memory layers of the system but confined to a node region.

A second method is to add a new large-capacity collective memory layer capable of reducing an access time interval between an off-chip memory layer and a storage device layer depending on a hardware characteristic. In general, an existing method is the technology that provides a new large-capacity swap memory layer interworking with an in-system swap mechanism (e.g., TeraMem) and can also be applied to even the multi-node system. However, this memory layer causes a processor of a single node using the corresponding large-capacity collective memory service to have a load of a context exchange caused due to a swap and has a problem in maintaining a share mechanism layer apart from the memory layer when a processor managed for each node intends to share the memory as the memory in the multi-node system. As technology similar thereto, there is a method (e.g., vSMP Foundation of ScaleMP) of collecting nodes of the multi-node system, virtualizing the nodes as single abstractive hardware and driving a single system image on a virtual system. This method is advantageous in providing a single memory viewpoint similarly to an existing system by collectively virtualizing memory resources of multiple nodes, but limitative in system extensibility due to a large load depending on virtualization.

A third method as a method for improving an access time itself of a storage device corresponds to disk cache technology (e.g., MVP of RNA networks) as the multi-node system. This method as a method of configuring a global disk cache as the multi-node system by collecting some memories of the system is suitable for an existing storage device based data centralized service, but causes an additional input/output load through the storage device in burst type large-capacity stream data processing.

SUMMARY

The present invention has been made in an effort to provide a software architecture for providing a large-capacity collective memory layer as a multi-node system on an existing system memory layer architecture by using a remote direct memory access and a software virtualization technique on the multi-node system, and a method for providing a service of a collective memory using the software architecture.

Disclosed is a software architecture that generates a new large-capacity collective memory layer on an existing memory layer structure by using a remote direct memory access technique and a virtualization technique in multi-nodes connected through a low-delay and high-speed internal communication network.

The software architecture generating the new memory layer according to the exemplary embodiment of the present invention includes: registering a predetermined memory region of a node as a contribution memory and initializing a large-collective memory; collectively managing the contribution memory of each node in a system; managing the shape of the large-capacity collective memory; processing a user interface of the large-capacity collective memory; mapping the large-capacity collective memory to a virtual address space in a user process; processing a fault of the mapped large-capacity memory; prefetching remote memory data for preventing the large-capacity collective memory from being blocked; supporting sharing of the large-capacity collective memory in a multi-node system; supporting a large-capacity collective memory processing protocol; monitoring a state of the large-capacity collective memory; and commands for managing an interface library for providing the large-capacity collective memory service to a user and the large-capacity collective memory layer.

Disclosed is a computing device performing high-performance computing processing by using the software architecture.

The computing device performing the high-performance computing processing by using the software architecture according to another exemplary embodiment of the present invention includes: a plurality of modules operating in a kernel of each node; and an interface library and management commands providing the large-capacity collective memory service to an application program from a user region.

The present invention provides the following effect.

First, by providing a large-capacity collective memory layer as a multi-node system on an existing system memory layer architecture by using a remote direct memory access and software virtualization technique on the multi-node system, a user's demand for a large-capacity memory increased in a data centralized high-performance computing environment as software technology can be accepted and an access time can be shortened more than an off-chip memory layer on a multi-node system connected through a low-delay and high-speed internal communication network. Further, it is possible to support a computing device that performs high-performance computing processing by using the software architecture.

Second, by using a prefetching mechanism module in order to prevent an input/output delay which can occur at the time of accessing a large-capacity collective memory region which exists in a remote node, it is possible to effectively reduce a load in context exchanging which can be generated in a process using the corresponding memory.

Third, since hardware of the multi-node system does not need to be virtualized, application to an existing multi-node system environment is easy and since there is no load caused by hardware virtualization, it is easy to build up a system having numerous nodes.

Fourth, unlike an existing disk cache, since there is no input/output load with respect to a storage device, it is suitable for burst type large-capacity stream processing having a real-time feature.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
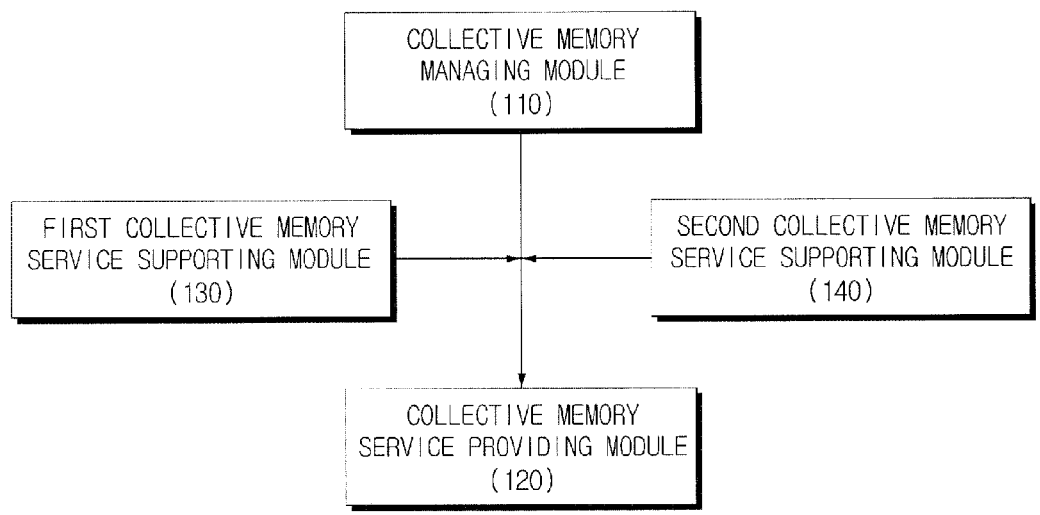
FIG. 1 is a block diagram showing a software architecture for a service of a collective memory according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Throughout the specification, unless explicitly described to the contrary, the word "comprise" and variations such as "comprises" or "comprising", will be understood to imply the inclusion of stated elements but not the exclusion of any other elements.

Figure 2:
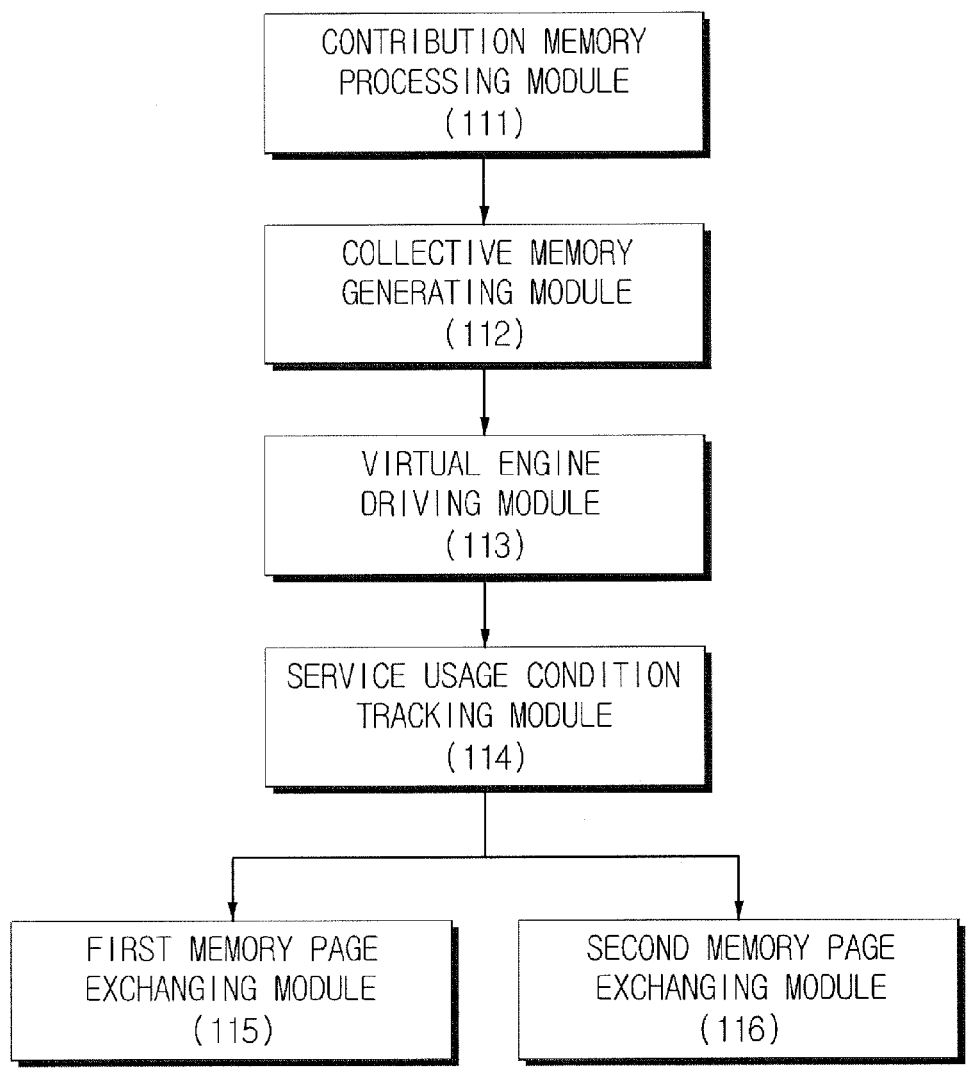
FIGS. 2 and 3 are block diagrams specifically showing an internal configuration of a software architecture for a service of a collective memory.
Figure 3:
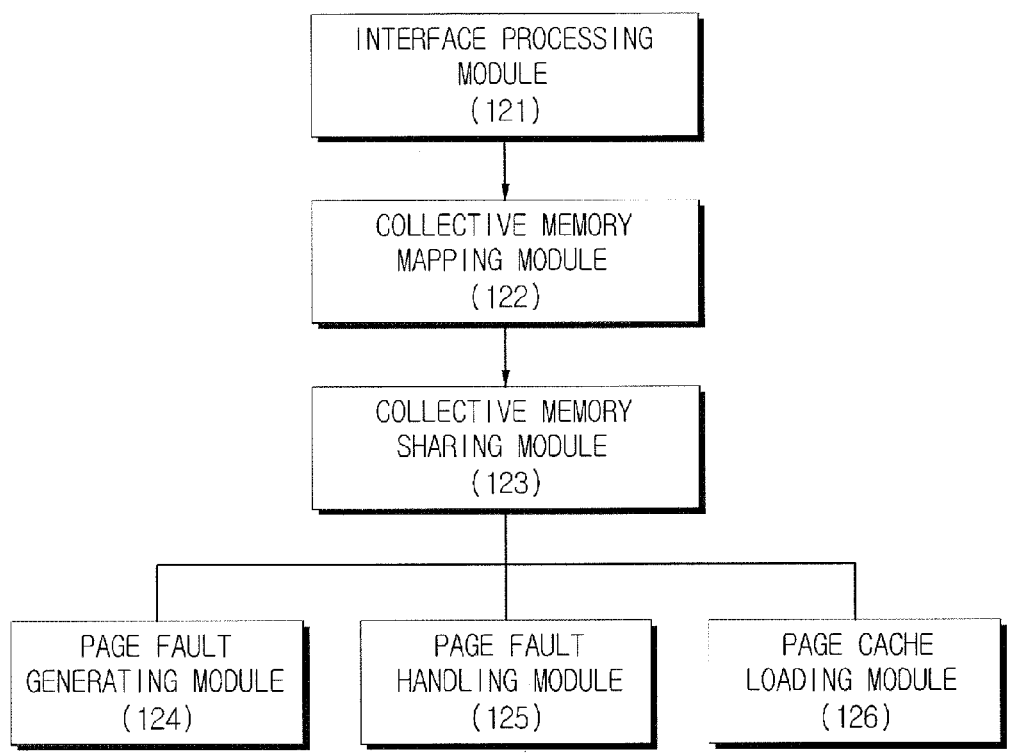

FIG. 1 is a schematic block diagram showing a software architecture for a service of a collective memory according to an exemplary embodiment of the present invention. FIGS. 2 and 3 are block diagrams specifically showing an internal configuration of a software architecture for a service of a collective memory. The following description refers to FIGS. 1 to 3.

Referring to FIG. 1, a software architecture 100 for a service of a collective memory includes a collective memory managing module 110 and a collective memory service providing module 120. In the exemplary embodiment, the software architecture is implemented by a virtual engine shaped through interworking among nodes. Further, the software architecture is implemented in a kernel of a computing device configuring cloud computing.

The collective memory managing module 110 virtualizes memories given from the nodes to manage the virtualized memories as the collective memory. The collective memory managing module 110 may be implemented as, for example, an engine formalizer unit 301. The collective memory managing module 110 may include a contribution memory processing module 111, a collective memory generating module 112, and a virtual engine driving module 113, as shown in FIG. 2. The contribution memory processing module 111 registers the memories given from the nodes as a contribution memory through a predetermined protocol. The collective memory generating module 112 virtualizes the registered contribution memory to generate the virtualized contribution memory as the collective memory. The virtual engine driving module 113 initializes the virtual engine and manages the generated collective memory with the initialized virtual engine.

The collective memory managing module 110 may further include a service usage condition tracking module 114, a first memory page exchanging module 115, and a second memory page exchanging module 116. The service usage condition tracking module 114 tracks a service usage condition of the collective memory. The service usage condition tracking module 114 may be implemented as, for example, a CVM managing 301b. According to a tracking result, when the collective memory is positioned on a local node, the first memory page exchanging module 115 exchanges memory pages by using a transaction protocol layer at the time of providing the service of the collective memory. On the contrary, according to the tracking result, when the collective memory is positioned on a remote node, the second memory page exchanging module 116 exchanges the memory pages by using an HCA at the time of providing the service of the collective memory. The first memory page exchanging module 115 may be implemented as, for example, a local CM managing 301d and the second memory page exchanging module 116 may be implemented as, for example, a remote CM managing 301e.

Meanwhile, the collective memory managing module 110 may further include a collective memory state information acquiring module and a collective memory state information reporting module. The collective memory state information acquiring module acquires state information associated with the service usage condition of the service of the collective volume memory through monitoring. The collective memory state information reporting module reports the acquired state information to a monitoring server monitoring the collective memory service. The collective memory state information acquiring module and the collective memory state information reporting module may be implemented as, for example, a CVM monitor unit 306.

The collective memory service providing module 120 provides the service of the collective memory by mapping the collective memory to a selected node through a process virtual address space. Preferably, the collective memory service providing module 120 prefetches data to a node to map the collective memory. Further, the collective memory service providing module 120 reserves and maps the collective memory to a physical memory position of a node that gives the memory. In the exemplary embodiment, the collective memory managing module 110 and the collective memory service providing module 120 may be implemented as, for example, a CVM core block 300.

The collective memory service providing module 120 may include an interface processing module 121, a collective memory mapping module 122, and a collective memory sharing module 123, as shown in FIG. 3. The interface processing module 121 processes an interface for supporting the collective memory service. The collective memory mapping module 122 maps the collective memory to a virtual address space to be used as the memory for each node selected through the interface. The collective memory sharing module 123 allows the selected nodes to share the collective memory when the number of the selected nodes is at least two. The interface processing module 121 may be implemented as, for example, a CVM API supporter unit 302. The collective memory mapping module 122 may be implemented as, for example, a CVM address manager unit 304. The collective memory sharing module 123 may be implemented as a CVM sharer unit 303.

Meanwhile, the collective memory service providing module 120 may further include a page fault generating module 124, a page fault handling module 125, and a page cache loading module 126. The page fault generating module 124 generates a page fault at the time of attempting an initial access to a page included in a memory region to which a service using node that intends to the service of the collective memory is mapped. The page fault handling module 125 handles the page fault when the page fault is generated. The page cache loading module 126 loads a physical page of the collective memory on a page cache on the service using node. When the loading is completed, the service using node can access the collective memory, and as a result, the service of the collective memory can be provided.

The software architecture 100 for the service of the collective memory may further include a first collective memory service supporting module 130 and a second collective memory service supporting module 140. The first collective memory service supporting module 130 supports the collective memory service by providing an interface for using the collective memory. The second collective memory service supporting module 140 supports the service of the collective memory by providing a command for processing the collective memory. The first collective memory service supporting module 130 may be implemented as, for example, a CVMlib block 310 and the second collective memory service supporting module 140 may be implemented as, for example, a CVMctrl block 320.

The software architecture 100 generates a new large-capacity collective memory layer on an existing memory layer architecture by using a remote direct memory access and virtualization technique in multi nodes connected through a low-delay and high-speed internal communication network. In particular, the software architecture 100 collects small-capacity memory regions of the nodes into a large-capacity node by using a software memory virtualization layer and provides the large-capacity collective memory layer having a longer access time than a system memory on the existing memory layer architecture to a user on the multi-node system connected through the low-delay and high-speed internal communication network (e.g., 10G Ethernet or InfiniBand) in order to accept a user's demand for a large-capacity memory increased in a data centralized high-performance computing environment.

Figure 4:
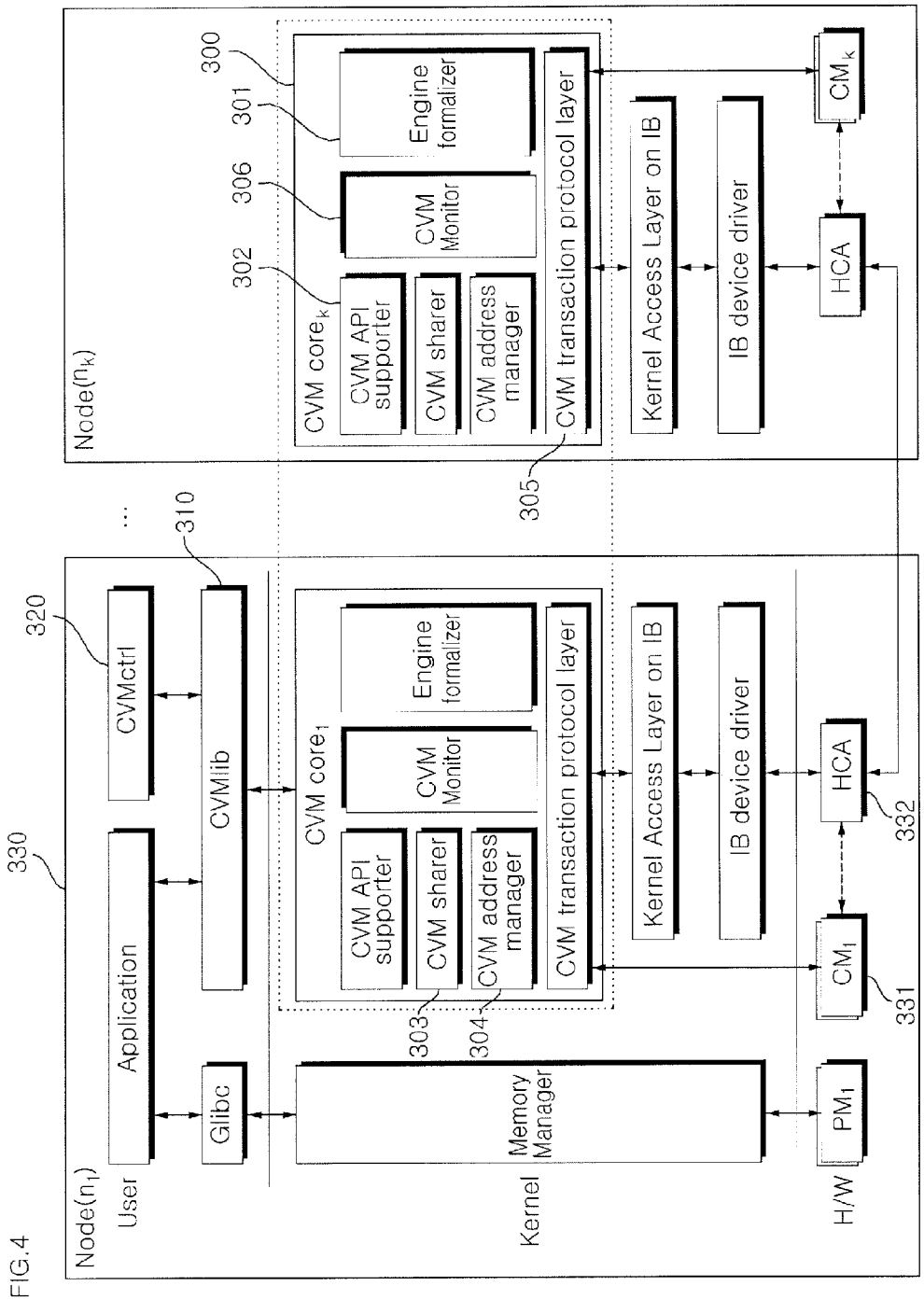
FIG. 4 is a configuration diagram schematically showing a software architecture supporting a large-capacity collective memory layer primarily with a multi-node system.
Figure 5:
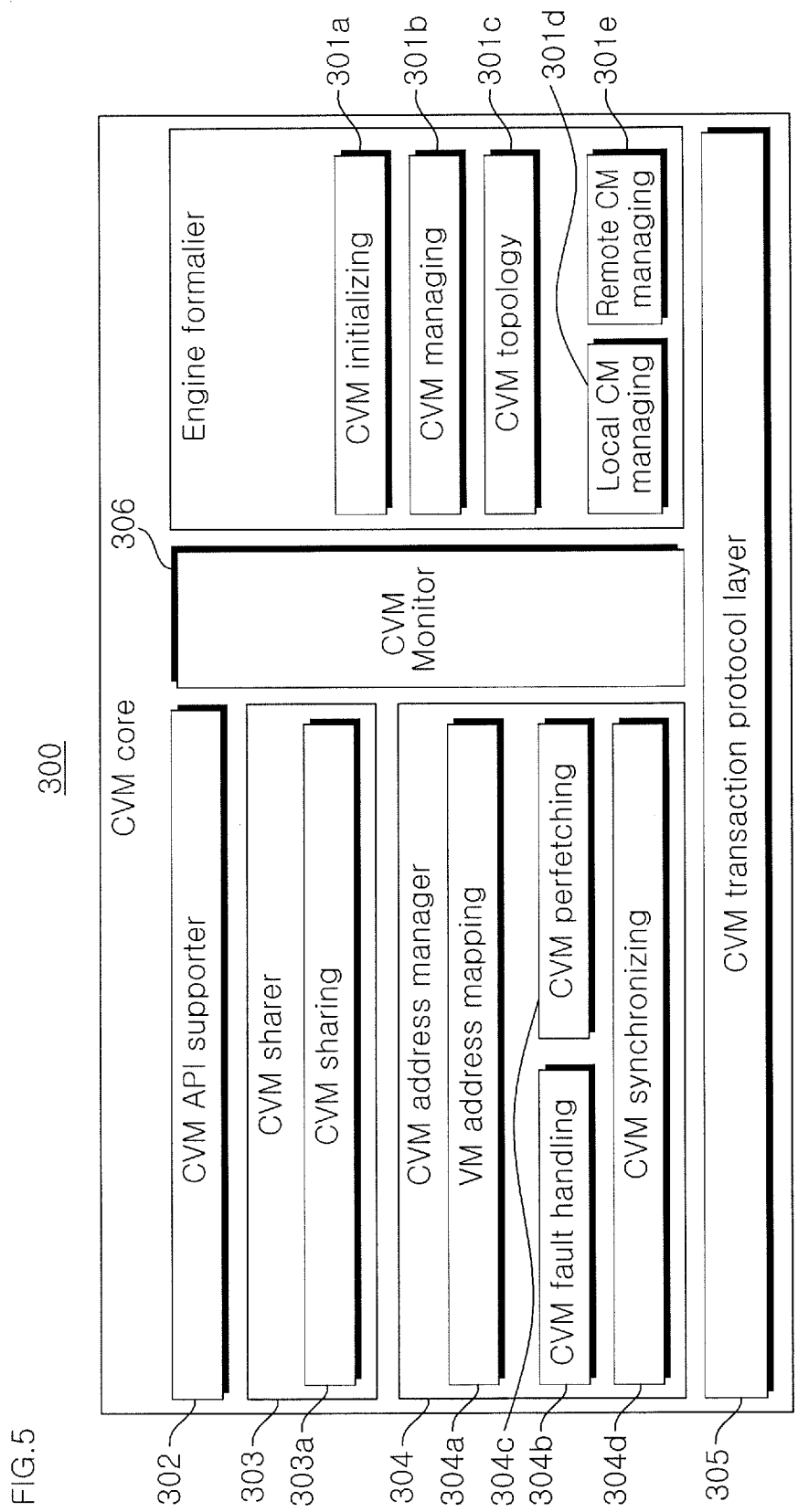
FIG. 5 is a configuration diagram showing main components of a CVM core module which is the core in the software architecture providing the large-capacity collective memory layer.
Figure 6:
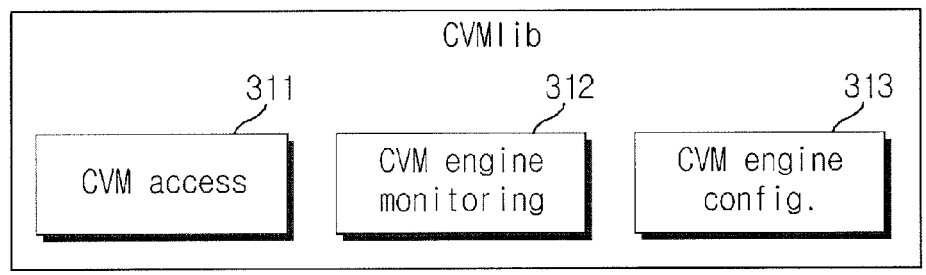
FIG. 6 is a configuration diagram showing an interface library providing a user interface in the software architecture providing the large-capacity collective memory layer.

By using the software architecture 100, it is possible to easily support a computing device performing high-performance computing processing in a cloud computing environment. Further, it is possible to break from technological dependency of memory hardware at the time of providing the large-capacity collective memory layer on the existing multi-node system and effectively reduce a load of a context exchange while using the memory. In addition, a problem of system extensibility caused by memory virtualization is solved by providing a memory sharing support service in the aspect of the system and it is suitable to process burst type large-capacity stream data by supporting the large-capacity collective memory layer. Hereinafter, referring to FIGS. 4 to 6, the software architecture for providing the large-capacity collective memory service according to the exemplary embodiment of the present invention will be described in detail. FIG. 4 is a configuration diagram schematically showing a software architecture supporting a large-capacity collective memory layer primarily with a multi-node system. FIG. 5 is a configuration diagram showing main components of the CVM core module 300 which is the core in the corresponding software architecture. FIG. 6 is a configuration diagram showing an interface library providing a user interface in the corresponding software architecture.

Referring to FIG. 4, the software architecture providing the large-capacity collective memory layer on the multi-node system connected through the high-speed and low-delay internal communication network according to the exemplary embodiment of the present invention includes a CVM core block 300 providing the large-capacity collective memory layer to individual nodes, a CVMlib block 310 which is a user interface layer providing the corresponding memory service to a user or an application program, and a CVMctrl block 320 which is a command layer managing the large-capacity collective memory layer. Among the blocks, the CVM core block 300 is included in all nodes 330 that intend to provide the large-capacity collective memory service for the user.

The system user and the application program that intend to use the large-capacity collective memory service use the CVMlib block 310 and the CVMctrl block 320. The CVMctrl block 320 is a user command interface tool for controlling the CVM core block 300 which is a lowest part. The CVMlib block 310 provides an application programming interface (API) associated with the use of the large-capacity collective memory to a programmer as a sharing/static library which the application program can use by linking to its own execution code in order to use the large-capacity collective memory service. The programmer may develop an application program using the large-capacity collective memory service by using the application programming interface. In the above description, the execution code represents an object file in which a source code of the application program is compiled.

The CVM core block 300 actually processes all large-capacity collective memory service related operations requested by the user and the application program through the upper blocks 310 and 320, and provides the service. The block 300 as a component that exists on a kernel of each node 330 forms a software layer that operates as a virtual CVM engine having a meaning only when the system operates through interworking of a plurality of CVM core blocks 300. As shown in FIG. 4, the CVM core block 300 on the node 330 interworks with the CVM core block 300 of another node through a node connection network (e.g., InfiniBand) below the node to form a CVM engine which is an operation executing object on the multi-node system.

The CVM engine shapes the large-capacity collective memory by collectively virtualizing a contribution memory CM 331 provided from each node 330 and a data exchange and a function interworking among the CVM core blocks 300 which occur during the shaping are transparent in the application program. That is, the application program executed on each node 330 cannot recognize the large-capacity collective memory layer as virtual collective resources of memories that physically are positioned in multi-nodes, and recognizes and uses the large-capacity collective memory layer as local memories positioned on its node 330.

The CVM core block 300 initializes a CVM engine object of the corresponding node 330 through the engine formalizer unit 301, registers and manages the CM 331 of the its own node 330 as a local CM, and configures a shape thereof as the large-capacity collective memory of the system level, manages, and tracks the CM 331. Further, the CVM core block 300 includes a CVM API supporter unit 302 processing an API request from the CVMlib block 310, a CVM address manager 304 allowing a user process to map the large-capacity collective memory to a process address space and use the large-capacity collective memory like the memory, a CVM sharer unit 303 allowing the large-capacity collective memory layer to provide a memory sharing support function on the multi-node system, and a CVM transaction protocol layer unit 305 allowing remote CMs that exist on a remote node to interexchange virtual memory processing requests. The CVM core block 300 may include a CVM monitor unit 306 monitoring state information of the large-capacity collective memory layer and providing a reporting function of the corresponding information.

The CVM core block 300 exchanges the memory page directly through the CVM transaction protocol layer unit 305 when the large-capacity collective memory to be accessed is positioned on the local CM, but exchanges the memory page by directly accessing the remote CM of a target node through its own HCA 332 without passing through a CPU when the access target is the remote CM positioned in the remote node.

FIG. 5 is a diagram showing the structure of the CVM core block 300 in more detail. The CVM engine configures a single virtual large-capacity collective memory by collecting CMs positioned in a plurality of nodes. When the CVM core block 300 forming the CVM engine is initialized, the CVM core block 300 reserves a CM contributed by a kernel in an LM on the node. The designed memory region cannot be used for different purpose in an operating system of the node, and is managed and used by only the CVM core block 300. The CVM core block 300 operates the large-capacity collective memory service by interworking with the CVM core block 300 of another node. The CVM core block 300 is constituted by a plurality of units. Functions of each unit and the lower unit thereof will be described below.

The engine formalizer unit 301 transfers data received through a CVM engine configuration API of the CVMlib block 320 to a CVM initializing 301a to initialize the local CM and builds up the shape of the local CM as the large-capacity collective memory managed by the CVM managing 301b through a CVM topology 301c. The CVM managing 301b selects operation targets of a local CM managing 301d and a remote CM managing 301e that exist therebelow by receiving a support from the CVM topology 301c in order to manage a basic large-capacity collective memory. Further, the CVM managing 301b manages information of tracking the use of the large-capacity collective memory.

The CVM API supporter unit 302 selects a unit that will process a relevant operation in order to call an API of the CVMlib block 310. The operation is performed by calling the engine formalizer unit 301 when the called API is associated with initialization of the CVM engine, calling the CVM address manager unit 304 when the called API is associated with memory allocation, calling the CVM sharer unit 303 when the called API is associated with memory sharing supporting, and calling the CVM monitor unit 306 when the called API is associated with monitoring the state of the large-capacity collective memory.

The CVM sharer unit 303 supports a sharing mechanism of the large-capacity collective memory performed throughout the multi-nodes by using a CVM sharer unit 303.

The CVM address manager unit 304 maps the user address space of the large-capacity collective memory through VM address mapping 304a and processes a memory fault generated at the time of firstly accessing the memory through CVM fault handling 304b. Further, a CVM prefetching 304c performs prefetching in which the CVM prefetching 304c moves the required remote CM on the remote node to its own node before actually using the remote CM in order to prevent a processing delay generated to perform input/output at the time of accessing the remote CM. A CVM synchronizing 304d performs synchronization required to solve a problem of consistency of memory data which may occur in multiple references.

The CVM transaction protocol layer unit 305 provides a large-capacity collective memory processing protocol layer for performing the above-mentioned functions targeting the remote node.

The CVM monitor unit 306 serves to retrieve and report the state information of the large-capacity collective memory provided by the CVM core block.

FIG. 6 is a diagram showing a software architecture of the CVMlib block 310. The CVMlib block 310 as the sharing/static library that defines an efficient common module for an application program that intends to use the large-capacity collective memory service and provides the application programming interface to the outside includes a CVM access unit 311, a CVM engine monitoring unit 312, and a CVM engine configuration unit 313 inside. The application program may develop the execution code using the large-capacity collective memory service function by using the application programming interface provided by the CVMlib block 310.

In general, functions provided by the CVMlib block 310 include allocation and cancellation of the large-capacity collective memory according to an allocation policy of a predetermined memory, verification of information on a present state of the large-capacity collective memory, verification of information on a present state of the CM for each node, verification of information on a memory distribution for each node for the allocated large-capacity collective memory, starting and ending of the CVM engine, shape management of the large-capacity collective memory, and the like.

Figure 7:
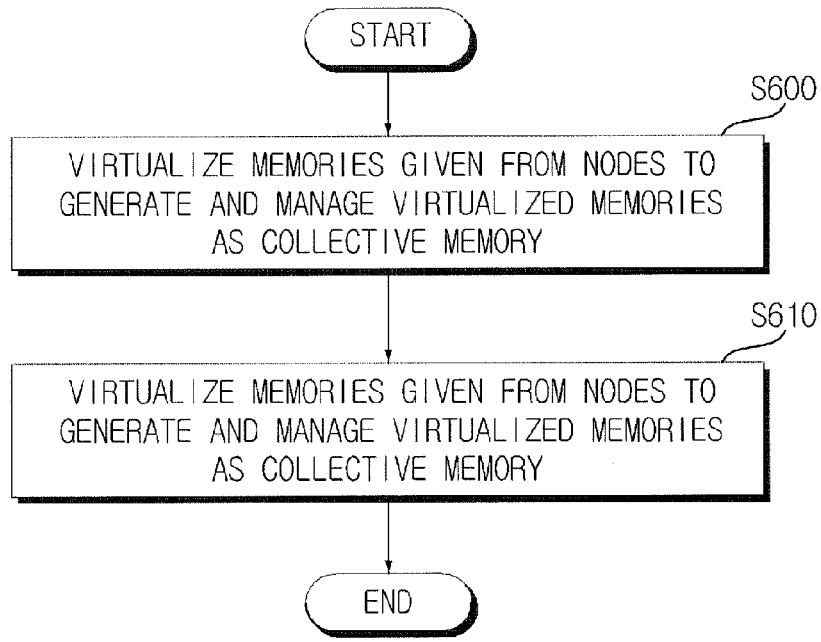
FIG. 7 is a flowchart showing a method for providing a service of a collective memory according to an exemplary embodiment of the present invention.

Next, a method for providing a service of a collective memory by using the software architecture according to the exemplary embodiment will be described. FIG. 7 is a flowchart showing a method for providing a service of a collective memory according to an exemplary embodiment of the present invention. The following description refers to FIG. 7.

First, memories given from nodes are virtualized and managed as a collective memory (managing the collective memory, S600). In the exemplary embodiment, the managing of the collective memory (S600) may include processing a contribution memory, generating the collective memory, and driving a virtual engine. In the processing of the contribution memory, the memories given from the nodes are registered as local memories through a predetermined protocol. In the generating of the collective memory, the registered contribution memories are virtualized to be generated as the collective memory. In the driving of the virtual engine driving module, the virtual engine is initialized and the generated collective memory is managed with the initialized virtual engine.

After the driving of the virtual engine, acquiring collective memory state information, reporting the collective memory state information, and the like may be performed. The acquiring of the collective memory state information acquires state information associated with the service usage condition of the collective memory through monitoring. In the reporting of the collective memory state information, the acquired state information is reported to a manager server managing the collective memory service.

Meanwhile, the driving of the virtual engine may include tracking a service usage condition and exchanging a memory page. In the tracking of the service usage condition, the service usage condition of the collective memory is tracked. In the exchanging of the memory page, when the collective memory is positioned on a local node according to a tracking result, the memory page is exchanged by using a transaction protocol layer at the time of providing the collective memory service and when the collective memory is positioned on a remote node according to the tracking result, the memory page is exchanged by using an HCA at the time of providing the collective memory service.

Thereafter, the collective memory service is provided by mapping the collective memory to a selected node through a virtual address space (providing the collective memory service, S610). Preferably, in the providing of the collective memory service (S610), data is prefetched in a node to which the collective memory will be mapped.

In the exemplary embodiment, the providing of the collective memory service (S610) may include processing an interface, mapping the collective memory, and sharing the collective memory. In the processing of the interface, the interface for supporting the collective memory service is processed. In the mapping of the collective memory, the collective memory is mapped to the virtual address space to be used as the memory for each node selected through the interface. In the sharing of the collective memory, the collective memory is shared by the selected nodes when the number of the selected nodes is at least two.

Meanwhile, the providing of the collective memory service (S610) may further include generating a page fault, handling the page fault, loading a page cache, and executing the collective memory service. The steps may be performed together with the sharing of the collective memory. In the generating of the page fault, the page fault is generated at the time of attempting an initial access to a page included in a memory region to which a service using node intending to use the collective memory service is mapped. In the handling of the page fault, the page fault is handled when the page fault is generated. In the loading of the page cache, a physical page of the collective memory is loaded on the page cache on the service using node. In the executing of the collective memory service, when the loading is completed, the collective memory service is executed by permitting the service using node to access the collective memory.

Supporting the collective memory service may be performed between the managing of the collective memory (S600) and the providing of the collective memory service (S610). In the supporting of the collective memory service, the collective memory service is supported by providing the interface for using the collective memory or the collective memory service is supported by providing a command for processing the collective memory.

Figure 8:
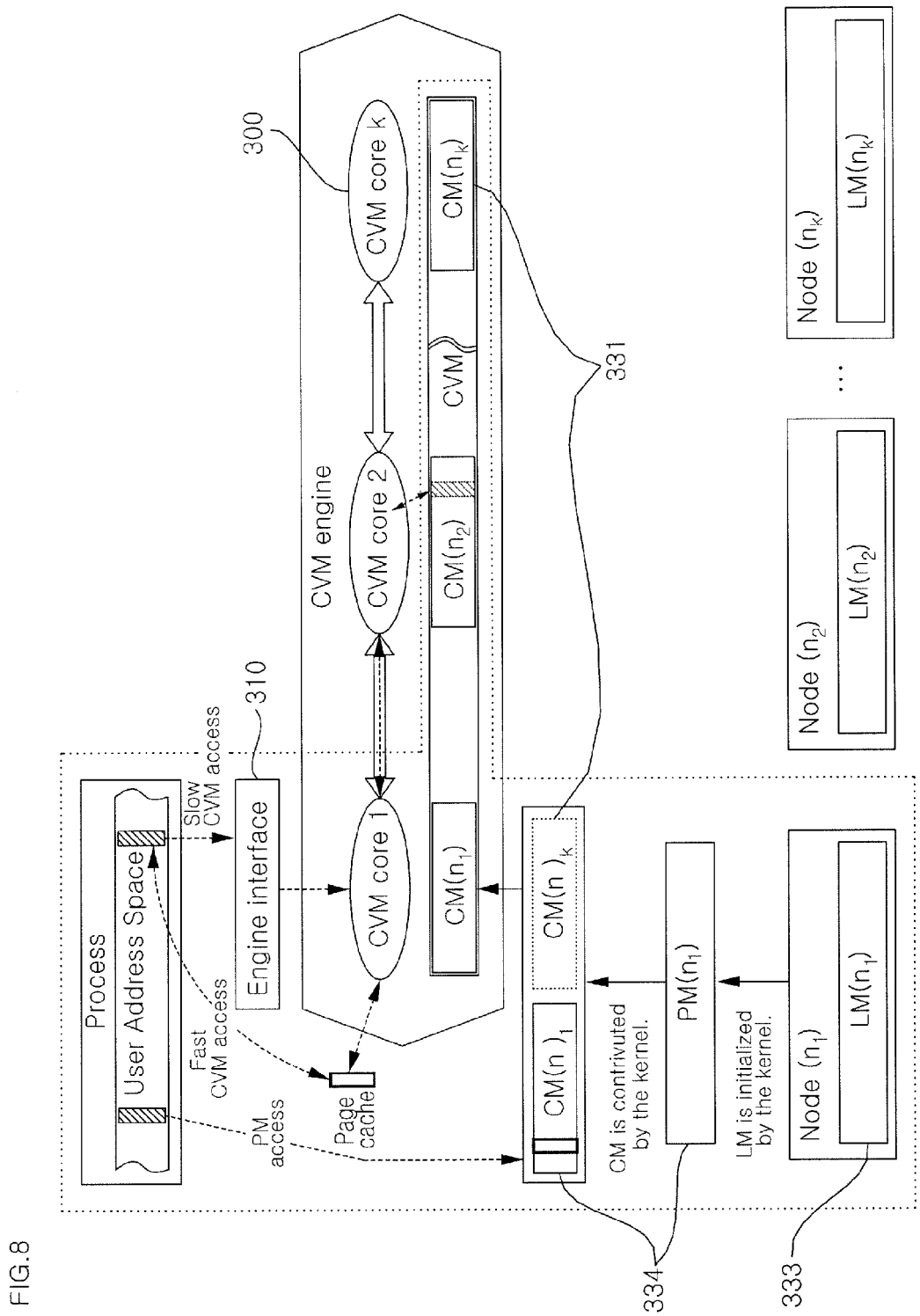
FIG. 8 is an operational diagram showing a basic operation in which a software architecture providing a large-capacity collective memory layer is operated.

FIG. 8 is a diagram showing a logical basic operation of software providing a large-capacity collective memory layer.

A CM 331 that exists on each node is initialized to be collected to a large-capacity memory by a CVM core block 300. The CM 331 starts in a physical memory LM 333 on each node before an operating system operates. The LM 333 is managed with an operation memory PM 334 by a kernel and a contribution memory CM 331 is formed by being contributed with a predetermined memory region from the kernel in the PM 334. The CM 331 of each node is collectively virtualized to the large-capacity memory by the CVM core block 300.

The PM 334 of each node is allocated and operated according to a method used in an existing system. However, the CM 331 is operated internally differently through the CVM core block 300 configuring a CVM engine.

The large-capacity collective memory layer performs memory allocation and cancellation by using a CVM access API of an engine interface 310. When memory allocation is requested by an application program, the CVM core block 300 finds an available memory region of a node suitable for allocation based on allocation information of the large-capacity collective memory. In VM address mapping, a physical memory region to be allocated is mapped to a virtual address space of a user process so that the user process can access the physical memory region like the existing memory.

A CPU generates the page fault at the time of firstly accessing the page included in the memory region to which the process is mapped. In order to process the page fault, CVM fault handling is performed through a page fault handler of the kernel. In the CVM fault handling, an actual physical page of the large-capacity collective memory is loaded on the page cache on its own node. When the loading of the page is completed, the user process may access the large-capacity collective memory through the corresponding page like a general memory.

Functions provided in the present invention are to configure an abstractive large-capacity collective memory layer by collecting small-capacity memories of nodes in order to support a memory-based data processing paradigm. The functions are basically to prefetch data and provide memory sharing in a multi-node system in order to overcome a delay phenomenon of input/output calculations which may occur to access a contribution memory on a remote node.

The present invention is constituted by a CVMctrl block and a CVMlib block of a user region, and a CVM core block processing an operation of a large-capacity collective memory service. CVM metadata is constituted by a cluster setting information table and a CVM allocation state information table which are global information of a cluster master node and a CVM local state information table and a CVM allocation map which are local node information. Dynamic reconfiguration of a contribution memory region of a predetermined node of a large-capacity collective memory is performed through interworking of a master node and a local node having the CVM metadata and a request for memory allocation is processed and changed by using state information. A request for allocation of the large-capacity memory is processed through a CVM local state information table of the local node and allocation state information of a CVM allocation state information table of the master node and when the allocation is achieved, an item for the corresponding state information is changed. Dynamic reconfiguration of a contribution memory region of the local node is performed by changing the state information item of the CVM local state information table and reconfiguring a CVM allocation map.

According to the present invention, since there is no input/output load for a storage device, it is suitable for burst type large-capacity stream processing having a real time property. Further, by using a pre-carry-in mechanism in order to prevent an input/output delay which may occur at the time of accessing a large-capacity memory region which exists in a remote node, it is possible to effectively reduce a load in context exchanging which may be generated in a process using the corresponding memory. Further, since hardware virtualization of the multi-node system is not required, there is no load due to unnecessary virtualization, such that it is easy to build up a system having numerous nodes and it is convenient to build up an existing multi-node system environment.

The present invention can be applied to the burst-type stream data processing through virtualizing the memory and supporting the memory sharing.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A software architecture for a service of a collective volume memory, comprising:
a computer system comprising a processor and a memory;
a collective memory managing module operating on the computer system to virtualize memories given from nodes to manage the virtualized memories as a collective memory, the collective memory managing module exchanging a memory page by different scheme based on where the collective memory is positioned;
a collective memory service providing module operating on the computer system to provide the collective memory service by mapping the collective memory to a selected node through a virtual address space,
wherein the collective memory managing module further includes:
a service usage condition tracking module tracking a service usage condition of the collective memory; and
first and second memory page exchanging modules that exchange a memory page by either one of
exchanging a memory page by using a transaction protocol layer at the time of providing the collective memory service when the collective memory is positioned on a local node according to a tracking result, and
exchanging the memory page by using a host channel adaptor (HCA) at the time of providing the collective memory service when the collective memory is positioned on a remote node according to the tracking result, wherein
the first memory page exchanging module is utilized when the collective memory is positioned on a local node according to a tracking result, and
the second memory page exchanging module is utilized when the collective memory is positioned on a remote node according to the tracking result.

2. The software architecture of claim 1, further comprising: a first collective memory service supporting module supporting the collective memory service by providing an interface for using the collective memory; or a second collective memory service supporting module supporting the collective memory service by providing a command for processing the collective memory.

3. The software architecture of claim 2, wherein the collective memory service providing module prefetches data in the node to which the collective memory is mapped.

4. The software architecture of claim 1, wherein the collective memory managing module includes: a contribution memory processing module registering the memories given from the nodes as a contribution memory through a predetermined protocol; a collective memory generating module virtualizing the registered contribution memory to generate the virtualized contribution memory as the collective memory; and a virtual engine driving module initializing a virtual engine and managing the generated collective memory with the initialized virtual engine.

5. The software architecture of claim 1, wherein the collective memory managing module further includes: a collective memory state information acquiring module acquiring state information associated with the service usage condition of the collective memory through monitoring; and a collective memory state information reporting module reporting the acquired state information to a manager server managing the collective memory service.

6. The software architecture of claim 1, wherein the collective memory service providing module includes: an interface processing module processing an interface for supporting the collective memory service; a collective memory mapping module mapping the collective memory to the address space to be used as the memory for each node selected through the interface; and a collective memory sharing module allowing the selected nodes to share the collective memory when the number of the selected nodes is at least two.

7. The software architecture of claim 6, wherein the collective memory service providing module further includes: a page fault generating module generating a page fault at the time when a service using node that intends to use the collective memory service firstly attempts to access a page included in a mapped memory region; a page fault handling module handling the page fault when the page fault is generated; and a page cache loading module loading a physical page of the collective memory on a page cache on the service using node.

8. The software architecture of claim 1, wherein the collective memory service providing module reserves and maps the collective memory at a physical memory position of the node giving the memory.

9. The software architecture of claim 1, wherein the software architecture is implemented by the virtual engine shaped through interworking of the nodes or implemented in a kernel of a computing device configuring cloud computing.

10. A method operating on a computer system comprising a processor and a memory for providing a service of a collective volume memory, comprising:
   virtualizing, on the computer system, memories given from nodes to manage the virtualized memories as a collective memory; and
   providing, on the computer system, the collective memory service by mapping the collective memory to a selected node through a virtual address space, wherein the driving of a virtual engine includes:
   tracking a service usage condition of the collective memory; and
   exchanging a memory page by different scheme based on where the collective memory is positioned,
   wherein the exchanging memory page is performed
   either one of a transaction protocol layer at the time of providing the collective memory service when the collective memory is positioned on a local node according to a tracking result, and exchanging the memory page by using a host channel adaptor (HCA) at the time of providing the collective memory service when the collective memory is positioned on a remote node according to the tracking result.

11. The method of claim 10, further comprising: supporting the collective memory service by providing an interface for using the collective memory or supporting the collective memory service by providing a command for processing the collective memory.

12. The method of claim 11, wherein in the providing of the collective memory service, data is prefetched in the node to which the collective memory is mapped.

13. The method of claim 10, wherein the managing of the collective memory includes: registering the memories given from the nodes as contribution memories through a predetermined protocol; virtualizing the registered contribution memories to generate the virtualized contribution memories as a collective memory; and initializing the virtual engine and managing the generated collective memory with the initialized virtual engine.

14. The method of claim 10, wherein the managing of the collective memory further includes: acquiring state information associated with the service usage condition of the collective memory through monitoring; and reporting the acquired state information to a manager server managing the collective memory service.

15. The method of claim 10, wherein the providing of the collective memory service includes: processing an interface for supporting the collective memory service; mapping the collective memory to the address space to be used as the memory for each node selected through the interface; and allowing the selected nodes to share the collective memory when the number of the selected nodes is at least two.

16. The method of claim 10, wherein the providing of the collective memory service includes: generating a page fault at the time when a service using node that intends to use the collective memory service firstly attempts to access a page included in a mapped memory region; handling the page fault when the page fault is generated; loading a physical page of the collective memory on a page cache on the service using node; and executing the collective memory service by permitting the service using node to access the collective memo when the loading is completed.

17. A method operating on a computer system comprising a processor and a memory for providing a service of a collective volume memory, comprising:
   virtualizing, on the computer system, memories given from nodes to manage the virtualized memories as a collective memory;
   providing on the computer system the collective memory service by mapping the collective memory to a selected node through a virtual address space; and
   exchanging a memory page by different scheme based on where the collective memory is positioned,
   wherein the providing of the collective memory service includes:
   processing an interface for supporting the collective memory service;
   mapping the collective memory to the address space to be used as the memory for each node selected through the interface; and
   allowing the selected nodes to share the collective memory when the number of the selected nodes is at least two,
   and wherein the exchanging the memory page includes:
   exchanging the memory page by using a transaction protocol layer at the time of providing the collective memory service when the collective memory is positioned on a local node according to a tracking result, and
   exchanging the memory page by using a host channel adaptor (HCA) at the time of providing the collective memory service when the collective memory is positioned on a remote node according to a tracking result.

18. The method of claim 17 wherein the providing of the collective memory service includes: generating a page fault at the time when a service using node that intends to use the collective memory service firstly attempts to access a page included in a mapped memory region; handling the page fault when the page fault is generated; loading a physical page of the collective memory on a page cache on the service using node; and executing the collective memory service by permitting the service using node to access the collective memory when the loading is completed.

* * * * *